May 9, 1950   A. M. A. FERTÉ   2,507,001
ELECTRICALLY CONTROLLED PLANT THINNING MACHINE
Filed July 30, 1947   5 Sheets-Sheet 1
Fig.1
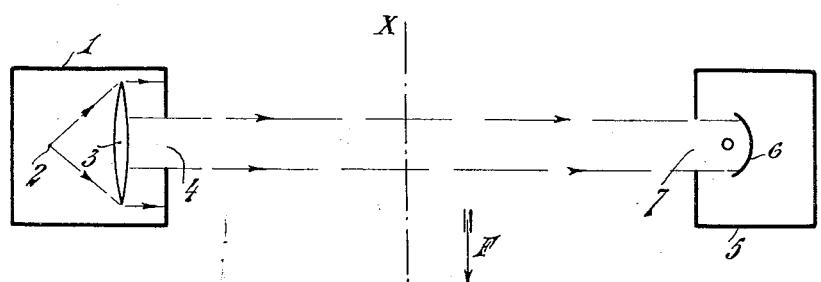
Fig.2
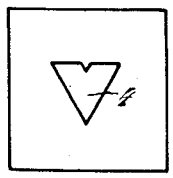
Fig.3
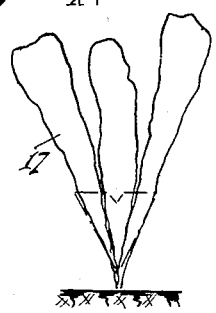
Fig.4
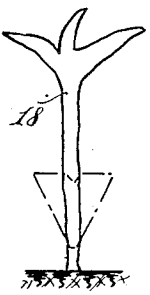
Fig.5
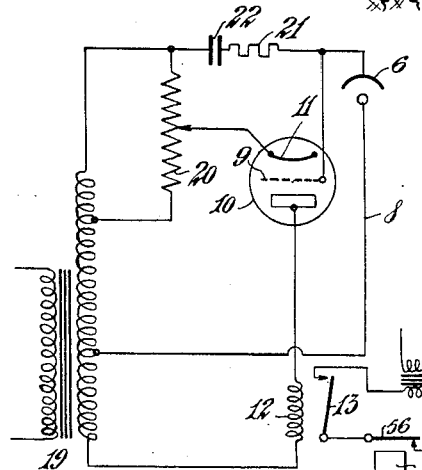
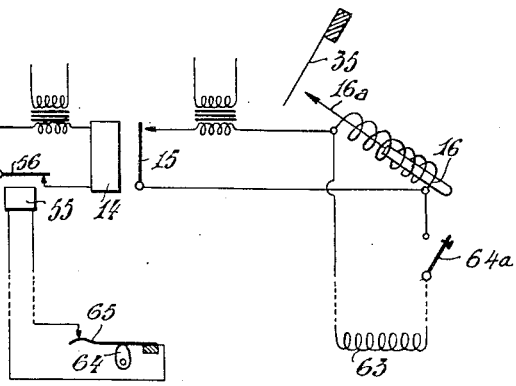
Fig.11
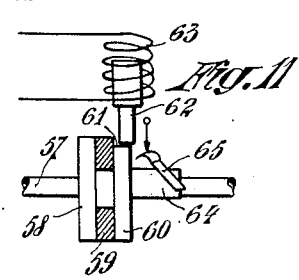
Inventor
André M. A. Ferté
by Stevens Davis & Miller
his attorneys

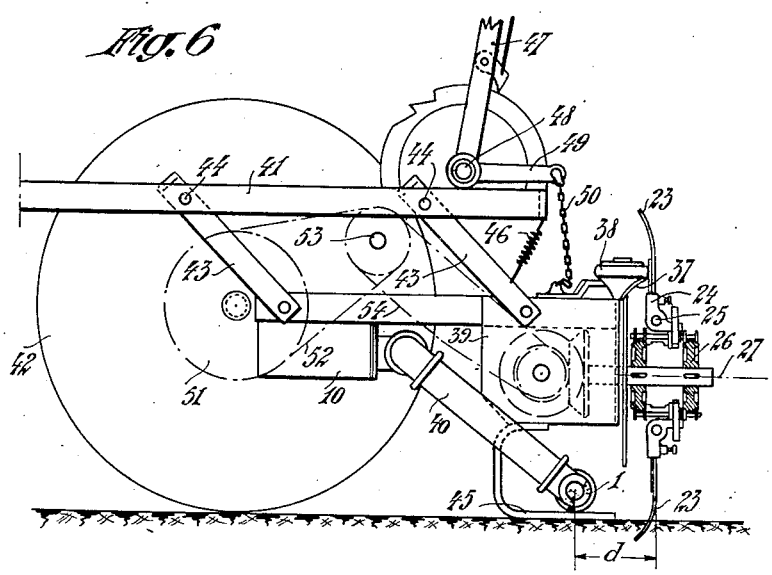
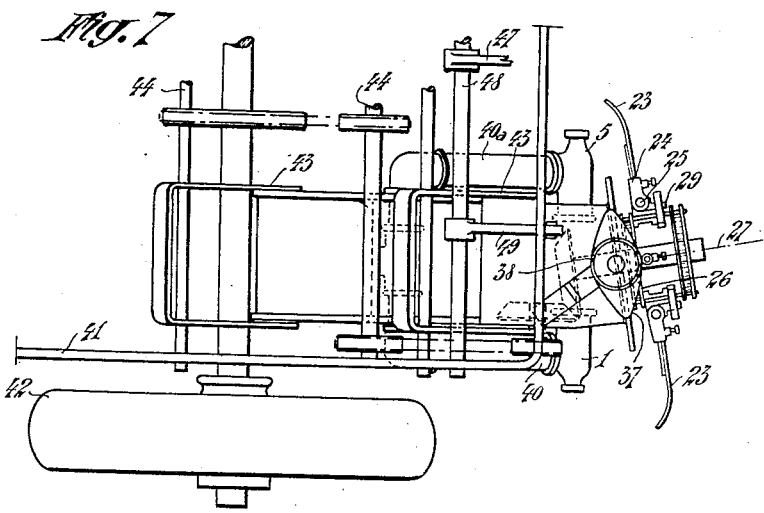

May 9, 1950        A. M. A. FERTÉ        2,507,001
ELECTRICALLY CONTROLLED PLANT THINNING MACHINE
Filed July 30, 1947        5 Sheets-Sheet 3
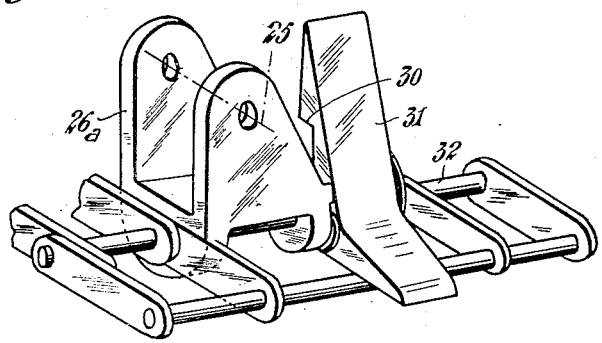
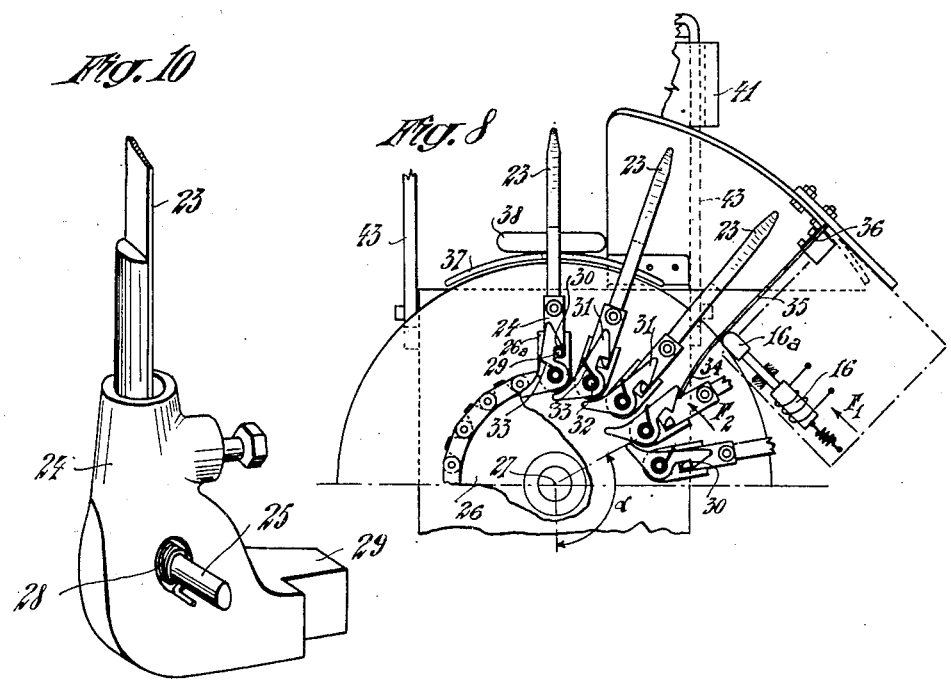

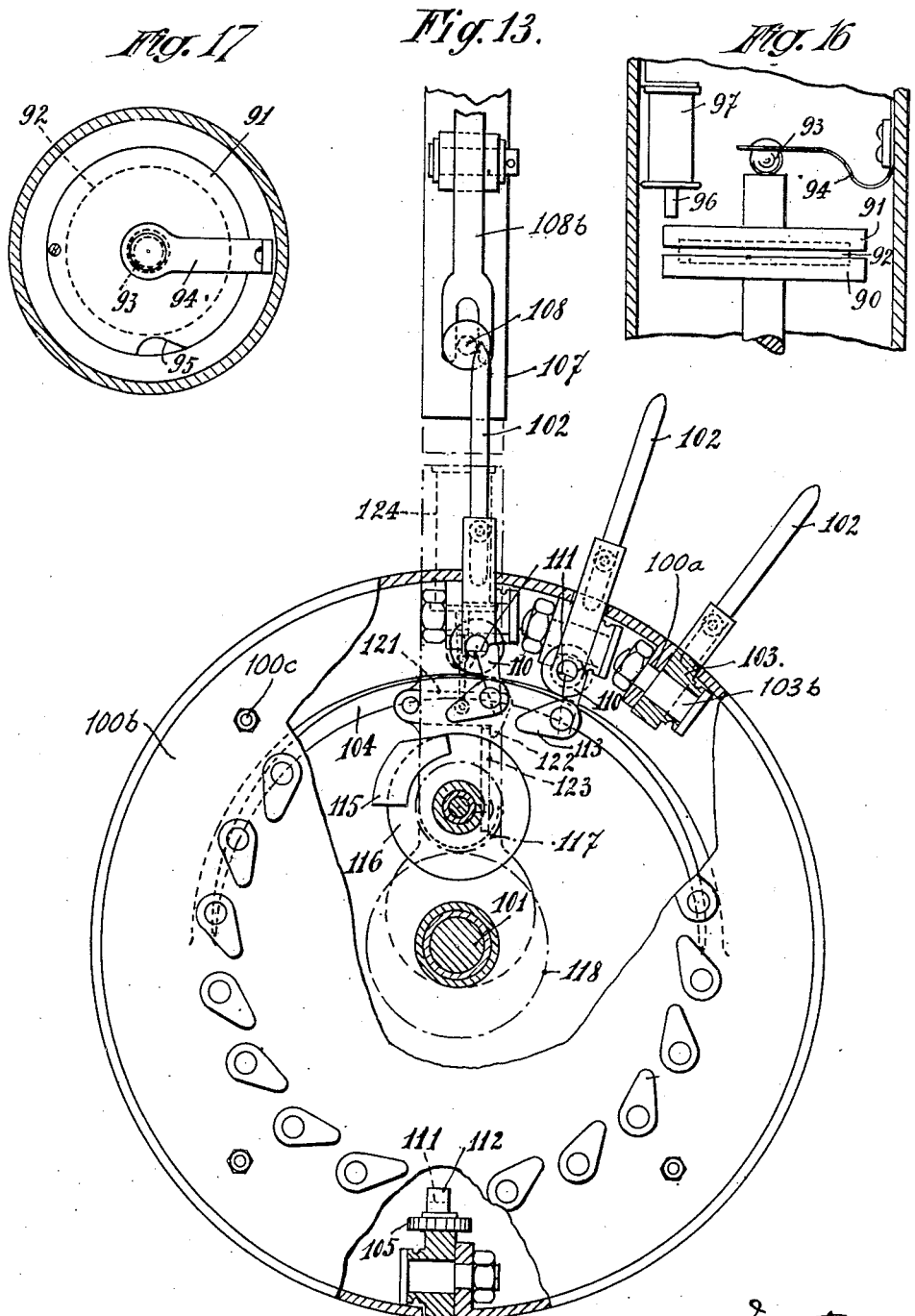

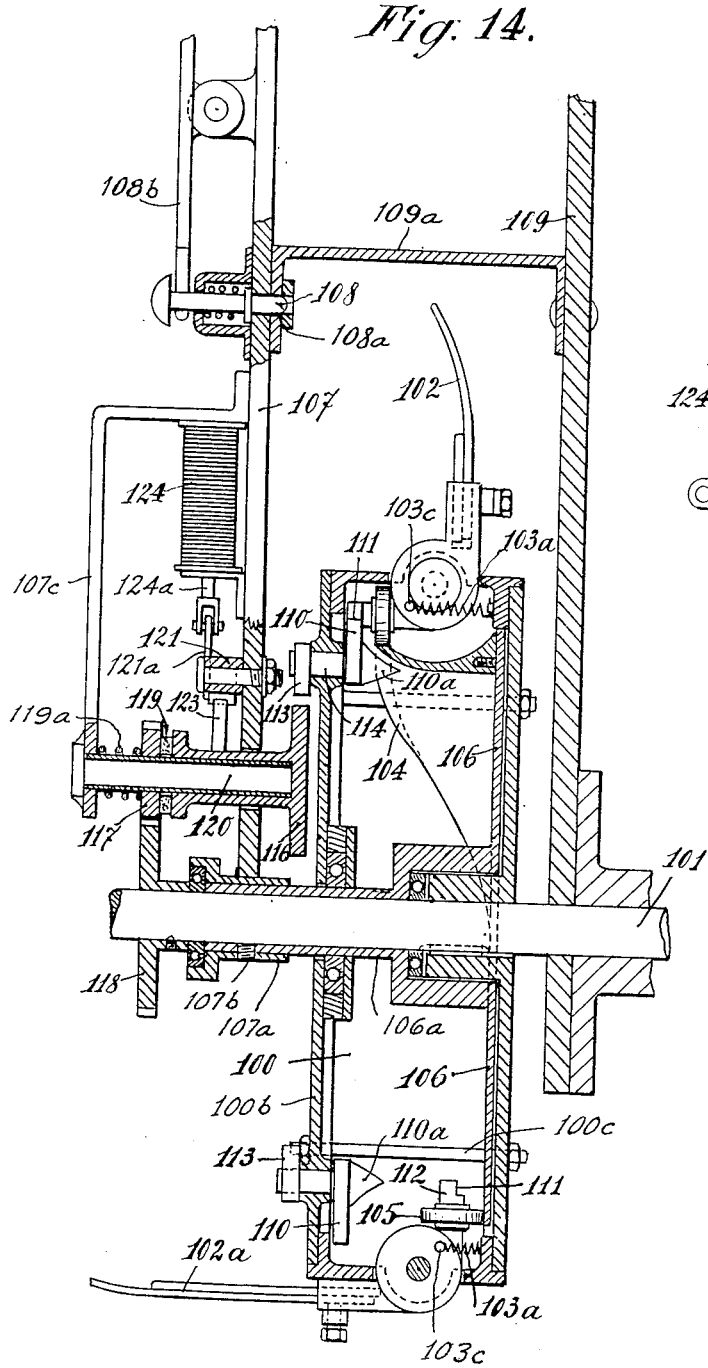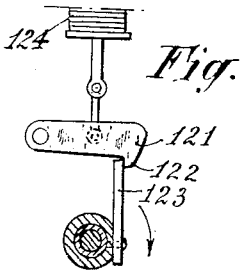

Patented May 9, 1950

2,507,001

UNITED STATES PATENT OFFICE 2,507,001

ELECTRICALLY CONTROLLED PLANT THINNING MACHINE

André M. A. Ferté, Terny, France

Application July 30, 1947, Serial No. 764,843
In France February 16, 1940

Section 1, Public Law 690, August 8, 1946
Patent expires February 16, 1960

8 Claims. (Cl. 97—15)

One of the objects of the present invention, is to provide an agricultural or horticultural machine in which the operative or inoperative position of certain tools carried by the machine, depending upon whether it is desired to remove, or on the contrary spare a plant placed on the path of the tools, is controlled automatically by electrical impulses, emitted for instance by a photo-electric cell, or other means of plant detection, or even by means of a rotating switch.

Machines of this kind have already been described in the U. S. Patent No. 2,177,803 of the applicant.

The present invention comprises various improvements which have been made in these previously described machines.

The present invention has especially for one of its objects to provide a device for the mounting of the ground-working tools onto the rim of a revolving plate driven in a continuous manner as the machine progresses along the ground.

A specially advantageous form of construction of the rocking tools, consists in combining them with a spring which tends to place them out of operation, each of these tools being however held in active position by a lock, turning together with a tool-holder, and in the path of which can be placed the releasing member actuated electrically by means of electrical impulses emitted by the plant detector.

According to a further novel feature of the invention, the mechanism setting the tools in inoperative position is entirely located within a closed rotating drum, comprising a tool holding plate comprising a member having an arrangement for the control setting the tools in inoperative position, the latter being brought back in an upright position by an inner railramp. The mechanism is thus protected against slush, grit, sand, gravel, etc.

On the other hand, it has been proved that, taking account of the speed with which the operations take place (3 or 4 operations per second approximately for a machine moving at a speed between 3 and 6 kilometers per hour), a great degree of accuracy cannot be obtained, in several cases, if special precautions are not observed, since the inertia of the electro-magnet controlling the tools causes sometimes the releasing of two tools simultaneously. According to the invention this mishap is prevented by inserting in the electrical circuit, a timing circuit, having for object to lengthen the action of the impulse, and by under placing between the fraise and the electromagnet a mechanical releasing device, designed in a way such, that for any speed of the fraise, only one, two, three . . . tools may be released simultaneously as desired.

Other characteristics of the invention will stand out as much from the following specification, as well as from the drawings hereto attached, given as non limitative examples, and with the object of helping to understand how the invention may be performed.

Fig. 1 is a plan view, showing schematically a luminous source and its associated photo-electric cell.

Fig. 2 is an elevation view of one the triangular slotted casings containing the luminous source and the photo-cell.

Figs. 3 and 4 are schematic elevation views intended to illustrate the operation of the exciting system of the photo-cell.

Fig. 5 is a schematic diagram showing the electrical circuit of the photo-cell and of the electrical release used for setting the tools in inoperative position.

Fig. 6 is a schematic view in lateral elevation of the whole machine.

Fig. 7 is a plan view of said machine.

Fig. 8 is a front partial view of the rotating tool-holder.

Figs. 9 and 10 show details of the mounting of the tools.

Fig. 11 shows schematically a device designed for the operation of the machine for the thinning out of the plants.

Fig. 12 is a schematic plane view illustrating the operation of the machine during the thinning out.

Fig. 13 is a front view, with parts broken away and in section, of one form of the tool holding fraise.

Fig. 14 is a vertical cross section corresponding to Fig. 13.

Fig. 15 shows seen from the front, the locking mechanism for the retraction of the tools shown in Fig. 13.

Fig. 16 is a schematic elevation view of the rotating distributor clutch.

Fig. 17 is a plan view corresponding to Fig. 16.

In the plan view shown in Fig. 1, line X—X shows a row of plants ready to be worked upon by the machine, this line represents also the path of the tool-holder as the machine progresses, this displacement occurring in the direction shown by the arrow F.

On one side of line X—X, the machine bears a casing 1, containing a luminous source 2, and a lens 3 giving a beam of parallel rays, a part of this beam comes out of the casing with a direction perpendicular to the displacement of the machine through a triangular opening 4 having its tip pointing downwards, as shown in Fig. 2. On the other side of line X—X and opposite the casing 1, is placed a second casing 5, containing a photo-electric cell 6, and which has, opposite the triangular opening 4, a similar triangular opening 7, through which the beam of the source 2 falls on the photo-electric cell 6.

As long as no plants are placed between the two casings 1 and 5, the cell receives the light and an electric current flows in the circuit 8 (see Fig. 5) giving to the grid 9 of the amplifying tube 10 a bias positive with respect to the cathode 11 of said tube, so that the relay 12, placed in the plate circuit of the latter, is excited and closes the contact 13. Closing this contact excites a second relay 14, which opens the contact 15, so that the electro-magnet 16 used to move the tools to inoperative position receives no current.

The shape of the slot 4 depends on the plants to be selected (beetroots for instance) so that these plants shut off as much as possible of the luminous beam when they are placed between the source and the cell.

It has been noticed that, in the case of beetroots for instance, the leaves of young plants form substantially a cone, whereas, on the contrary, the weeds which are between the beetroots, such as thistles, have bases which show the cylindrical outline of their stalks 18. It is therefore possible to give a triangular shape to the slot 4, so that when a beetroot passes between the source and the cell, this causes the luminous beam to be almost entirely shut off, whereas, on the other hand, when a weed passes, a much smaller part is shut off (naturally the shape of the slot will be adapted to each particular case, depending on the work to be done by the machine).

When a beet-root passes between the source and the cell, the current flow of the latter becomes nil or diminishes sufficiently so that the bias of the grid 9 of the tube 10 being more negative, the relay 12 releases its armature by opening the contact 13; then the relay 14 is not excited, the contact 15 is closed, and the releasing member 16 releases the tools, so that the beet root is spared.

If, on the contrary, a weed is in the path, as shown in Fig. 4, the relay 12 is still excited, the tools are not released and they pull the weed away.

The power supply of the tube can be furnished by a generator driven, for instance by the wheels of the machine, or alternatively, by the engine of the tractor used to move the machine across the field.

Fig. 5 shows a potentiometer 20, serving to adjust the bias of the grid 9, a resistor 21, in which the cell current is lowered to obtain the low tension necessary for the grid bias, and a condenser 22 serving to adjust the phase of the grid voltage.

The release system to place the tools in an inoperative position can be arranged as shown in Figs. 8 to 10. Each tool 23 is fixed by its base on a stirrup-piece 26a integral with the plate 26 which is driven so as to rotate, by the wheels of the machine; the pivoting axle 25 of each of the tools is perpendicular to the rotation axis 27 of the plate so that the releasing of one or more tools, when a plant is to be spared, is made perpendicularly to the plane of the plate.

A spring 28 is placed in each stirrup-piece between this stirrup and the axle 25; one of its ends is fixed to the stirrup, the other end fixed to the axle 25, and the spring works as a torsion spring, tending to push the tool constantly in an inoperative position.

But each of the tools is blocked in its working position by an arm 29, which engages under the tooth 30 of a lever 31 pivoting around an axle 32 perpendicular to the axle 25, that is to say, parallel with respect to the axis of rotation 27 of the plate. Each of these levers is held in position, where it locks the corresponding tool in a working position, by means of a spring 33, working also as a torsion spring.

In the trajectory made by the levers 31 during the rotation of the platform 26, is placed the free end of a flexible blade fixed to the frame of the machine by its other end. Each of these levers bend thus elastically the blade when passing opposite the said blade. Behind this blade is placed the armature 16a of the electro-magnet 16 which limits the flexibility of the said blade permitting however the levers 31 to pass when the electro-magnet is not excited. If, on the contrary, this electro-magnet is excited, that is, if the luminous beam is blotted out and does not light the cell, its armature 16a moves in the direction of the arrow $F_1$, thus limiting still more the flexibility of the blade 35. It results from this that the levers meeting the blade 35 during the time when the armature remains in this position, can only pass the blade by pivoting in the direction of the arrow $F_2$ towards their return spring. The corresponding stirrups 24 not now being held, the tool springs 28 move the latter into their inoperative position, and when the tools in an inoperative position are brought near the ground by the rotation of the plate 26, they spare the plants placed on this part of the ground.

The tools in the inoperative position are set automatically in an operating or "on" position as they meet, during the rotation of the plate, a fixed rail-ramp 37 terminated by a roller 38.

As shown in the Figures 5 and 7, each of the rotating fraises constituted in this manner is mounted on a frame 39, which bears the two casings 1 and 5 by means of arms 40 and 40a containing the optical part forming the luminous beam and the photo-electric cell respectively. This frame bears also, in a box, the amplifier 10 and the electrical circuits of the photo-cell. Each of the frames constituted in this manner form a unit and several of these can be placed on a same machine, so as to work several rows of plants in a parallel plane, similar to the row X—X of Fig. 1.

Each of these units is, preferably, independently mobile from the others, so as to follow the contours of the ground; to this effect an attachment can be provided on the main frame 41 of the machine, which rests on the ground through the two carrier wheels 42, by means of two arms 43 linked to rods 44 of the main frame and constituting thus a sort of link jointed parallelogram. Shoes as in 45 can be fixed for instance under the casings 1 and 5, resting on the ground. Traction springs 46 lighten each of the units.

The pivoting axles of the parallelogram can be provided so as to slide, to enable to adapt the machine for different widths of planting.

To roll the machine on the road or over a ground not worked upon; the whole assembly of the units may be raised by means of a lever 47, actuating the axle 48 and raising by means of the arms 49, clamped on the said axle, chains 50 fixed to the units.

The rotation movement of each of the tool holding fraises is secured by the carrier wheels 42 of the machine, so that each fraise turns in synchronization with the machine.

In the example shown, a pinion 51, clamped on the axle of the carrier wheels, drives through a chain 52, a secondary axle 53, connected to each of the fraises by chains 54 and an appropriate gear transmission.

The ratio of the transmission between the carrier wheels and each of the fraises must be such, that the time taken by the machine to go through the distance d between the cell and the plane of the corresponding fraise, is equal to the time taken by the fraise to turn of the amount of the angle made between the end 34 of the flexible blade 35 and the tool in an operating position.

The mode of operation which has just been described above concerns more specially the second dressing between the plants, that is, working the ground and ripping the weeds away in the intervals between the plants which are to remain.

The machine can also be used for the thinning out of plants, that is, for the clearing up of the rows of seedlings sown very close together, so as to leave plants only at given intervals in order to render easier their subsequent growth. For this, it is possible to place in the circuit controlled by the cell, for instance between the relay 13 and the relay 14, a supplementary relay 55, opening when not excited, a working contact 56.

On a shaft 57, driven in a continuous rotation by the wheel axle of the machine, is clamped a plate 58, entraining a cork ring through the medium of a friction member 59, a plate 60 mounted free on said axle and bearing a ratchet tooth 61, on which the end 62 of the armature of an electro-magnet 63 can engage when this electro magnet is not excited, so that at this moment the plate 60 is blocked.

This plate 60 is integral with a cam 64, which, when idle, closes the elastic contact 65 mounted in the exciting circuit of the relay 55.

The excitation of the relay 63 takes place when the contact 15 of the relay 14 is closed, when the hand switch 64a is closed.

The operation will now be described, in reference with Fig. 12, in which the line X'—X' shows a row of plants sown close together and in which it is desired to operate so as to leave plants only at intervals e.

The switch 64a is closed and the machine moves in the direction of the arrow F₂. When the photo-electric cell comes to the origin of the line X'—X', the first plant blots the beam off, the releasing member 16 is excited and sets the tools in an inoperative position, so that the first plant is spared, but at the same time the electromagnet is excited and draws its armature 62, and disengages the tooth 61, so that the plate 60 is carried on by the plate 58. The cam 64 opens then the contact 65 so that the relay 55 de-excited releases its armature and the contact 56 is open. It results from this, that during the time elapsed in one revolution of the plate 60, until the contact is closed again by the cam 64, the blotting out of the beam of the cell does not affect the releasing member 16, which does not receive any current. Consequently, all the plants except the first are pulled away in the interval e which corresponds to a complete revolution of the plate 60. When this revolution is completed the plate 60 is blocked again by the armature 61 of the electro-magnet 63 and the contact 65 is closed, the relay 55 being again excited and closing its contact 56. At this moment, the plant b passing in front of the cell, causes the excitation of the releasing member 16, and this plant is spared, but at the same time the electro-magnet 63 is again excited and the plate 60 starts a new revolution so that, in the following interval e, all the plants are pulled out until the plant c is reached, the latter being spared, and so on.

If, at the end of the revolution of the plate 60, for instance in d (Fig. 11) there are no plants, the plate 60 is blocked by the armature 62 of the electro-magnet 63, but the releasing member 16 not receiving any current, the tools still continue to work.

Arriving at f, the beginning of a new row of plants, the operations already described start again; the first plant f is spared, and the following plants are pulled out on the interval e and so on.

Figs. 13 to 15 refer to a modification of the mode of realization of the tool-holding fraise, specially strongly made, and reliable in operation because the mechanical tool removing and replacing organs are sheltered within a closed drum 100.

This drum is driven in rotation by the shaft 101, controlled by the movement of the machine over the ground. The drum 100 comprises, spaced on its periphery, a series of lugs 100a on which tools 102 (similar to the tools 23 shown in Figs. 6, 7 and 8) are mounted through the intermediary of supports 103 pivoting on axles 103b borne by the lugs 100a so that the tool may be brought into an operating position, as shown in 102 or in the inoperative position 102a.

The tools 102 are held in an inoperative position by means of a spring 103a one end of which is fixed to the drum whereas the other end is attached to a pin 103c on the support 103. They are brought automatically into operating position by means of a railramp 104, on which rolls a roller 105 mounted for rotation on an axle 112 rigid with the support 103. This railramp occupying 180° in length approximately is mounted on a plate 106 free on an axle 101 through the intermediary of a hub 106a projecting through the flange 100b of the drum 100, said flange being fixed to the remainder of the drum by bolts 100c. The position of this plate, and accordingly of the ramp is controlled by the position of the lever 107, which is fixed to a sleeve 107a keyed to the hub 106a, for instance, by means of a screw 107b. The lever 105 can be blocked with respect to the frame 109 of the machine by an appropriate locking system such as a pin and spring device 108 which cooperates with a hole 108a bored in a lug 109a borne by the frame 109. The device 108 may be disengaged by acting on a forked lever 108b borne by the lever 107.

The tools 102 brought into operating position by the railramp 104, may be held in this position after the ramp ceases to be active, by a catch or hammer 110 which catches on a flat 111 made at the end of the axle 112 around which pivots the roller 105 of each tool holder. This catch is integral with a step 113 pivoting on one of the flanges of the drum and arranged to be moved angularly around its axle 114 by means of a raised cam portion 115 borne on a plate 116, so that the catch may be pushed aside from the flat 111 and so release the tool holder 103 which urged back by the spring 103a, will return progressively, by means of the ramp 104, from the operating position to an inoperative position.

The catch 110 is brought back into its engaging position onto the flat 111 by means of the ramp 104 acting on a protruding part 110a borne by said catch.

The plate 116 may be driven in rotation by the pinion and gear 117—118, the gear being clamped on the axle 101.

The ratio between the pinion and the gear is figured so that the plate 116 revolves at a speed equal to twice the speed of the drum 100. The linking of the pinion 117 and the plate 116 is secured by means of a friction clutch 119.

The hub 116a of the plate 116 passes through the lever 107 and pivots on an axle 120 borne by an arm 107c fixed to the lever 107. A spring 119a, mounted on said axle between arm 107a and pinion 117 ensures the application of clutch 119. On the lever 107 pivots a stop 121, the catch of which 122 may be placed in the path of a finger 123 integral with the plate 116 (Fig. 15) so that the said plate is blocked, the clutch 119 slipping during this blocking.

To release the plate 116 and enable it to be driven, the stop 121 is held upright by means of an electromagnet 124 to the core 124a of which it is connected by a link 121a. Said electromagnet is controlled by the photo-electric cell, when the luminous beam actuating the latter is intercepted by a plant.

The plate 116, according to its rotation, by means of its embossing 115, acts on the stop 113 of the corresponding tool and releases the catch 110 from the flat 111 of the axle 112, so that the said tool is brought to an inoperative position by the action of the spring 103a and of the rail-ramp 104.

Several cam portions 115 may be provided on the plate 116 so as to control successively several tools.

It is possible to adjust the position of the plate 116 with respect to the drum 100, by modifying the angular position of the lever 107.

As it has been said above, the machine which is the object of the invention can solve different problems, the simplest of which consists in clearing the weeds off a plantation in which the distance between the plants has been done by hand, according to the older method. The cell placed in front of the fraise starts, as it passes before each plant, an electrical impulse the length of which depends on the size of the plant, this causing the release of a corresponding number of tools.

If it is desired to thin out plants or to place plants at intervals by means of the machine which is the object of the invention, two cases present themselves:

First case: The plants are spaced normally.

The cells are not used, their action is replaced by a revolving switch similar to those employed in motor ignition systems, and is driven by the tractor wheels through the medium of a chain, and this switch sends electrical impulses at regular intervals to the electro-magnet controlling the removing of the tools.

Second case: The plants are irregularly spaced.

In order to solve this problem, the revolving switch is designed in the following manner: (Figs. 16 and 17) in which 90 indicates a lower plate which is driven from the tractor wheels in counter-clockwise direction and which rotates continuously. Between lower plate 90 and upper plate 91 bearing the cam controlling the platinum points, is placed a small clutch constituted by a cork disk 92 the encasing of which is provided for in the discs.

The pressure on this clutch is adjusted by means of a ball 93 on which presses a flat spring 94. The upper plate 91 bears an appropriate slot 95 into which the armature of an electro magnet 97 is engaged in the idle position.

The speed of this distributor depends on the advancing speed of the machine; but between this distributor and the machine a gear box is interplaced, comprising four speeds providing a sufficient margin to permit an impulse every 25 or 30 cm. for instance.

Let us suppose that the row of plants is continuous; the cell connected to the electro-magnet 97 will excite it permanently, the upper plate will not be stopped, only the impulses sent by the distributor will release the tool or tools.

If, on the other hand, several plants are missing for about 10 centimeters, the electro-magnet 97 will be deexcited, but the distributor will continue to rotate, the armature of the electro-magnet sliding on a smooth part of the plate 91, because a normal distance to permit two plants to pass will not be reached. If, at the end of this distance of 10 cm. plants are found, the electromagnet will be excited again and the distributor will cause the tools to be released at the normal distance. Let us suppose that instead of 10 cm. without any plants, the distance is 30 cm., the electro-magnet 97 will be de-excited, the plate 91 will be blocked in a position permitting, when a plant will be seen at the same time that the tools will be lowered, the distributor to continue to rotate. In one word, the distancer opens the contact which shuts off the cell until the machine has covered the desired distance; if the cell does not detect anything, the distributor waits also. When the beet root appears, the cell actuates the removal of the tools, and frees the plate 91, which at its turn, shuts it off until the desired distance is reached if there is a plant, or until a plant is met. Therefore there will never be less than the distance fixed between two plants, isolated plants will be spared, and only the bare parts caused by a lack of plants or sowing will be worked upon until a plant is met.

By way of further explanation, it is to be noted that when plants are missing, the cell de-excites the electro-magnet 97 and the armature 96 falls. As long as the armature glides on the flat upper surface of the plate 91, the distributor rotates. When the armature 96 enters the notch 95, the distributor is stopped, until the cell detects a plant and then causes the electro-magnet to be excited and to raise its armature.

It must be understood that, without departing from the scope of the invention, modifications may be made in the embodiments which have just been described, and to combine in various ways the characteristics thereof.

What I claim is:

1. An agricultural machine comprising in combination, a frame movable over the ground, a support rotatably mounted on said frame, means for producing a continuous rotation of said support as the frame moves along the ground, soil working tools pivotally mounted on said support, springs connected to said support and to said tools for urging said tools into inoperative position, locking means supported from said support, adapted to engage said tools for holding them in an operative position against said springs, means supported from said frame for producing electrical impulses, means operated by said electrical impulses and adapted to cause said locking means to disengage said tools, and means supported from said frame, operatively associated with said tools for replacing them in their operative position.

2. An agricultural machine comprising in combination, a frame movable over the ground, a plate rotatably mounted on said frame, means for producing a continuous rotation of said plate as the frame moves along the ground, soil working tools pivotally mounted on said plate, springs connected to said plate and to said tools for urging said tools into inoperative position, locking means supported from said plate, adapted to engage said tools for holding them in an operative position against said springs, means supported from said frame for producing electrical impulses, means operated by said electrical impulses and adapted to cause said locking means to disengage said tools, and means supported from said frame, operatively associated with said tools for replacing them in their operative position.

3. An agricultural machine comprising in combination, a frame movable over the ground, a support rotatably mounted on said frame, means for producing a continuous rotation of said support as the frame moves along the ground, soil working tools pivotally mounted on said support, springs connected to said support and to said tools for urging said tools into inoperative position, projecting arms carried by said tools, levers linked to said support and adapted to engage said projecting arms for holding said tools in an operative position against said springs, springs connected to said support and to said levers for urging said levers into engagement with said projecting arms, means supported from said frame for producing electrical impulses, means operated by said electrical impulses and adapted to cause said levers to disengage said projecting arms, and means supported from said frame, operatively associated with said tools for replacing them in their operative position.

4. An agricultural machine comprising in combination, a frame movable over the ground, a support rotatably mounted on said frame, means for producing a continuous rotation of said support as the frame moves along the ground, soil working tools pivotally mounted on said support, springs connected to said support and to said tools for urging said tools into inoperative position, projecting arms carried by said tools, levers linked to said support and adapted to engage said projecting arms for holding said tools in an operative position against said springs, springs connected to said support and to said levers for urging said levers into engagement with said projecting arms, means supported from said frame for producing electrical impulses, a resilient blade secured to said frame, an electromagnet rigidly secured to said frame, and adapted to receive said electrical impulses, an armature in said electromagnet, adapted to be moved under the action of said electrical impulses and to cause said resilient blade to move said levers out of engagement with said projecting arms and means supported from said frame operatively associated with said tools for replacing them in their operative position.

5. An agricultural machine comprising in combination, a frame movable over the ground, a support rotatably mounted on said frame, means for producing a continuous rotation of said support as the frame moves along the ground, soil working tools pivotally mounted on said support, springs connected to said support and to said tools for urging said tools into inoperative position, projecting arms carried by said tools, levers linked to said support and adapted to engage said projecting arms for holding said tools in operative position against said springs, stops rigidly secured to said levers, a plate rotatably mounted on said frame and provided with bosses adapted to cause said levers to disengage said projecting arms carried by said tools, means supported by said frame and adapted for driving said plate, means for normally stopping the rotation of said plate, means supported by said frame for producing electrical impulses, means operated by said electrical impulses and adapted to release the action of said plate stopping means, causing thereby said bosses to move said levers out of engagement with said projecting arms, protruding parts borne by said levers, and means supported from said frame operatively associated with said protruding parts and with said tools, for replacing said levers in their engaging position and said tools in their operative position.

6. An agricultural machine comprising in combination, a frame movable over the ground, a support rotatably mounted on said frame, means for producing a continuous rotation of said support as the frame moves along the ground, soil working tools pivotally mounted on said support, springs connected to said support and to said tools for urging said tools into an inoperative position, projecting arms carried by said tools, levers linked to said support and adapted to engage said projecting arms for holding said tools in operative position against said springs, stops rigidly secured to said levers, a plate rotatably mounted on said frame and provided with bosses adapted to cause said levers to disengage said projecting arms carried by said tools, means supported by said frame and adapted for driving said plate, means for normally stopping the rotation of said plate, means supported by said frame for producing electrical impulses, an electro-magnet rigidly secured on said frame and adapted to receive said electrical impulses, an armature in said electro-magnet, adapted to be moved under the action of said electrical impulses and to release the action of said plate stopping means, causing thereby said bosses to move said levers out of engagement with said projecting arms, protruding parts borne by said levers, and means supported from said frame operatively associated with said protruding parts and with said tools, for replacing said levers in their engaging position and said tools in their operative position.

7. An agricultural machine comprising in combination, a frame movable over the ground, a support rotatably mounted on said frame, means for producing a continuous rotation of said support as the frame moves along the ground, soil working tools pivotally mounted on said support, springs connected to said support and to said tools for urging said tools into an inoperative position, projecting arms carried by said tools, levers linked to said support and adapted to engage said projecting arms for holding said tools in operative position against said springs, springs connected to said support and to said levers for urging said levers into engagement with said projecting arms, means supported from said frame for producing electrical impulses, a resilient blade secured to said frame, an electromagnet rigidly secured to said frame, and adapted to receive said electrical impulses, an armature in said electromagnet, adapted to be moved under the action of said electrical impulses and to cause said resilient blade to move said levers out of engagement with said projecting arms and a ramp supported from said frame operatively associated with said tools for replacing them in their operative position.

8. An agricultural machine comprising in combination, a frame movable over the ground, a support rotatably mounted on said frame, means for producing a continuous rotation of said support as the frame moves along the ground, soil working tools pivotally mounted on said support, springs connected to said support and to said tools for urging said tools into inoperative position, projecting arms carried by said tools, levers linked to said support and adapted to engage said projecting arms for holding said tools in operative position against said springs, stops rigidly secured to said levers, a plate rotatably mounted on said frame and provided with bosses adapted to cause said levers to disengage said projecting arms carried by said tools, means supported by said frame and adapted for driving said plate, means for normally stopping the rotation of said plate, means supported by said frame for producing electrical impulses, an electro-magnet rigidly secured on said frame and adapted to receive said electrical impulses, an armature in said electromagnet, adapted to be moved under the action of said electrical impulses and to release the action of said plate stopping means, causing thereby said bosses to move said levers out of engagement with said projecting arms, protruding parts borne by said levers, and a ramp supported from said frame operatively associated with said protruding parts and with said tools, for replacing said levers in their engaging position and said tools in their operative position.

ANDRÉ M. A. FERTÉ.

REFERENCES CITED

The following references are of record in the file of this patent:

UNITED STATES PATENTS

| Number | Name | Date |
|---|---|---|
| 1,303,798 | Janes | May 13, 1919 |
| 2,337,646 | Carbuhn | Dec. 28, 1943 |
| 2,400,562 | Marihart | May 21, 1946 |

FOREIGN PATENTS

| Number | Country | Date |
|---|---|---|
| 849,811 | France | Aug. 3, 1939 |